(No Model.)
J. MUNDELL & W. J. GORDON.
MACHINE FOR CUTTING SHOE SOLES.
No. 267,574. Patented Nov. 14, 1882.
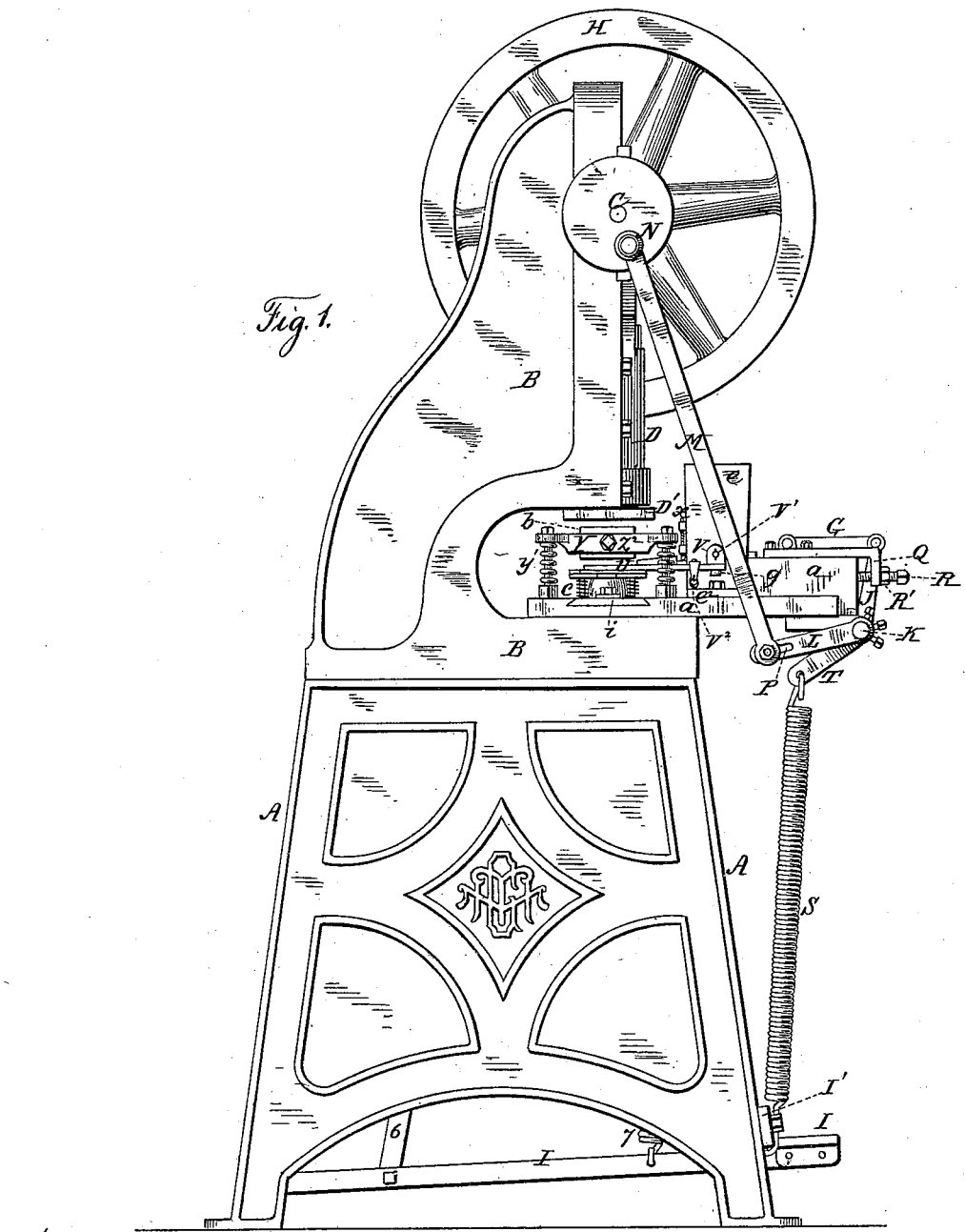

(No Model.)  5 Sheets—Sheet 2.
J. MUNDELL & W. J. GORDON.
MACHINE FOR CUTTING SHOE SOLES.
No. 267,574.  Patented Nov. 14, 1882.
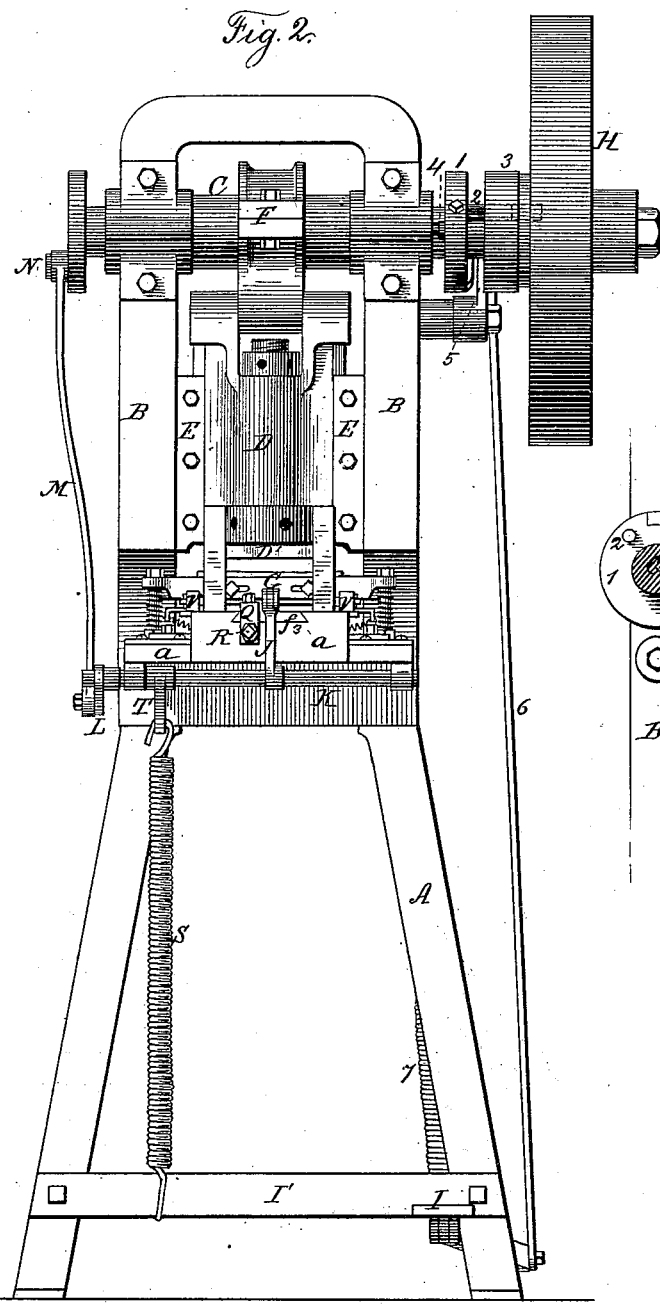
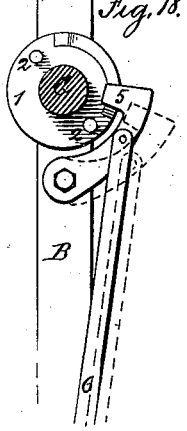

(No Model.) 5 Sheets—Sheet 3.
J. MUNDELL & W. J. GORDON.
MACHINE FOR CUTTING SHOE SOLES.
No. 267,574. Patented Nov. 14, 1882.
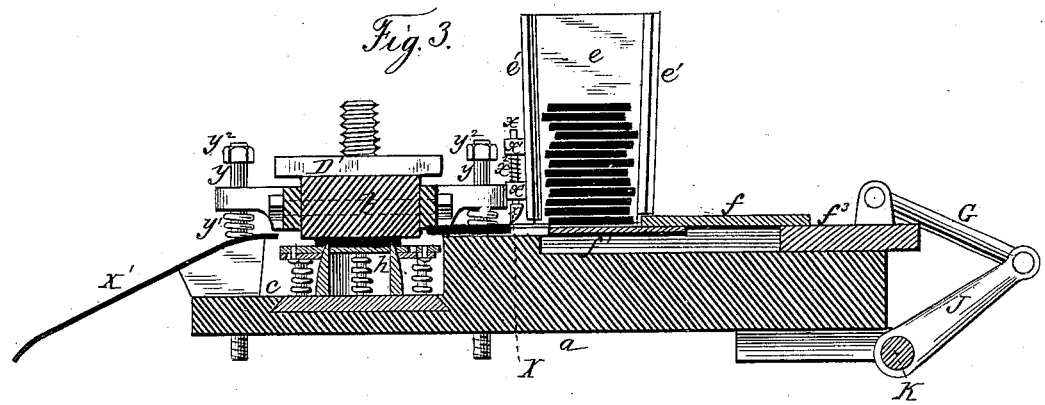
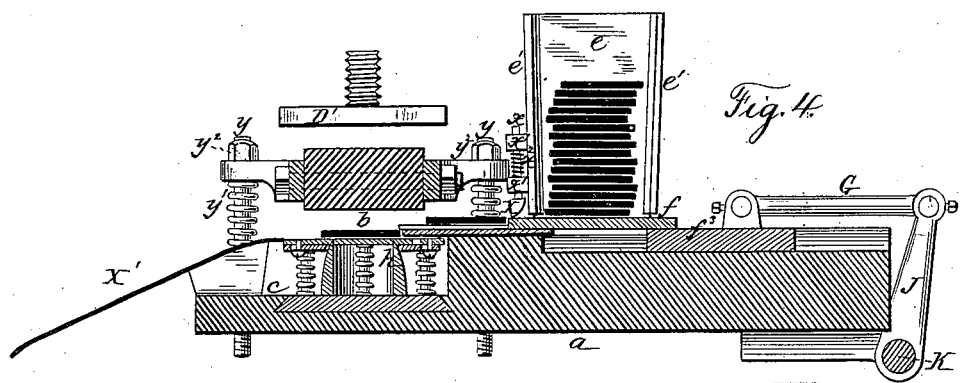
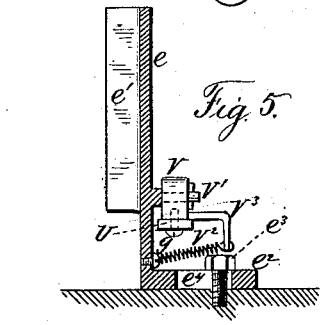
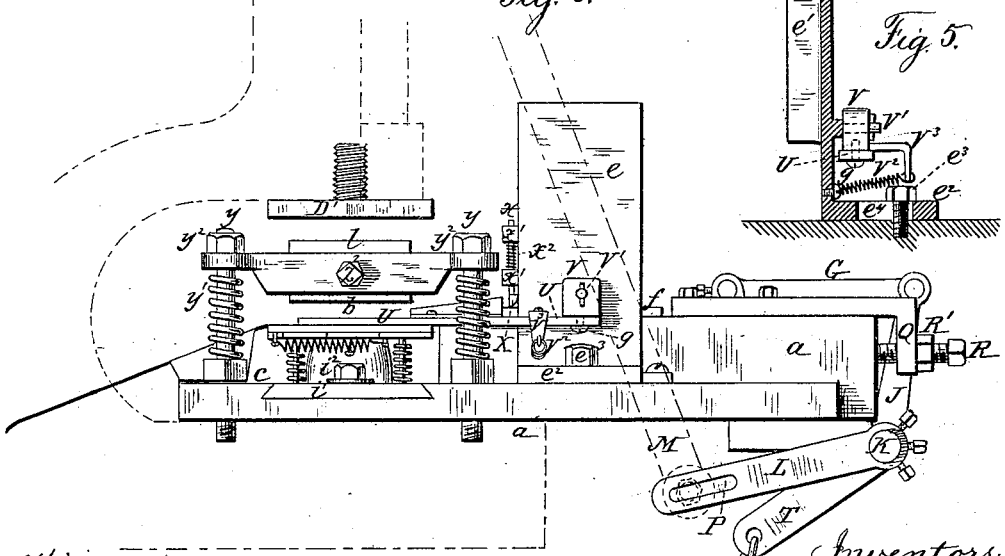
Witnesses:
Edmond Brodhag
Lowell Bartle
Inventors:
James Mundell
William J. Gordon
Johnson & Johnson
Attys.

(No Model.) 5 Sheets—Sheet 4.
J. MUNDELL & W. J. GORDON.
MACHINE FOR CUTTING SHOE SOLES.
No. 267,574. Patented Nov. 14, 1882.
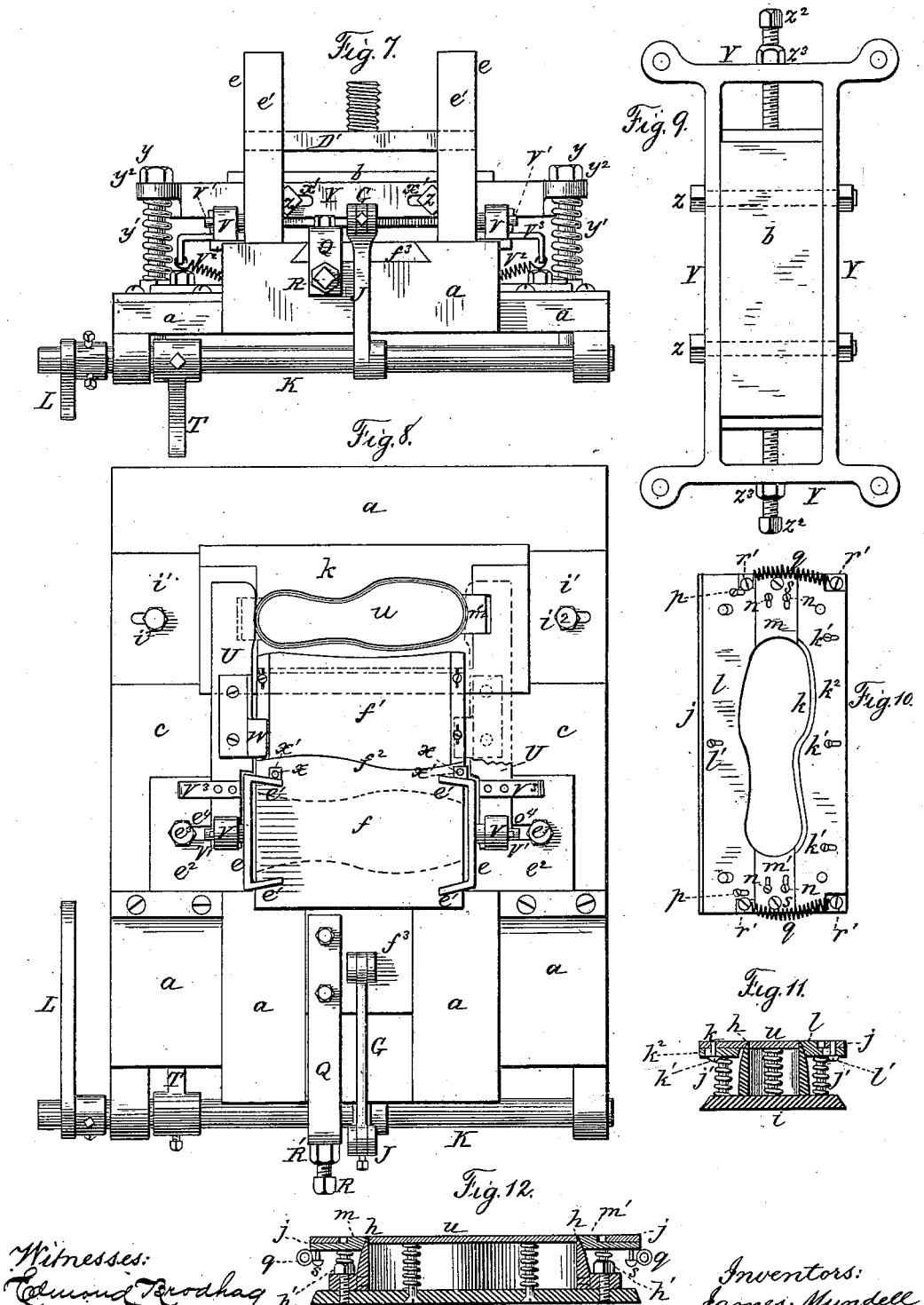
Witnesses:
Edmund Brodhag
Howell T. Bartte
Inventors:
James Mundell
William J. Gordon
Johnson & Johnson
Attys (No Model.)
J. MUNDELL & W. J. GORDON.
MACHINE FOR CUTTING SHOE SOLES.
No. 267,574. Patented Nov. 14, 1882.
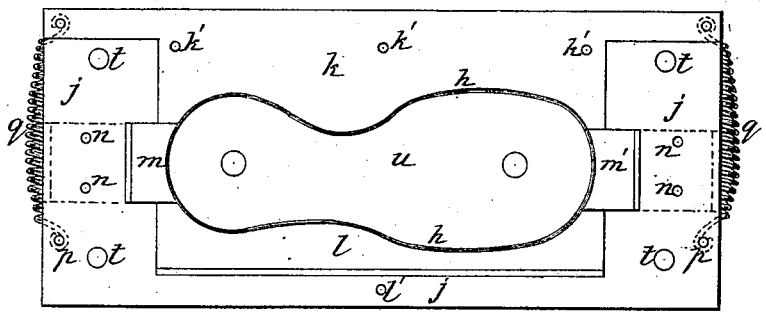
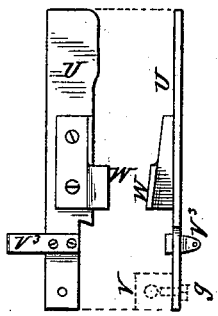
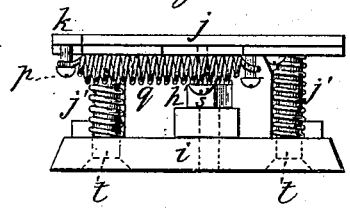
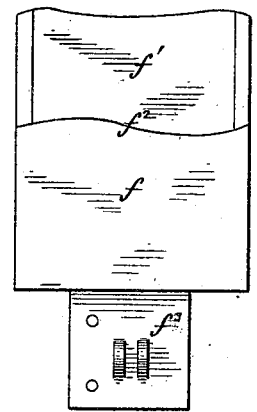
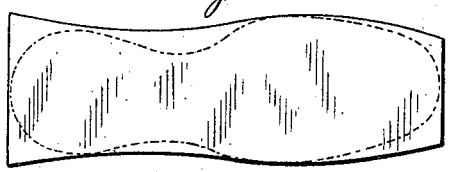
Witnesses:
Edmond Bioshag
Howell Bartle
Inventors:
James Mundell
William J. Gordon
pp Johnson & Johnson
Attys.
N. PETERS, Photo-Lithographer, Washington, D.C.

UNITED STATES PATENT OFFICE.

JAMES MUNDELL AND WILLIAM J. GORDON, OF PHILADELPHIA, PENNSYLVANIA, ASSIGNORS OF ONE-THIRD TO JOHN MUNDELL, OF SAME PLACE.

MACHINE FOR CUTTING SHOE-SOLES.

SPECIFICATION forming part of Letters Patent No. 267,574, dated November 14, 1882.

Application filed August 7, 1882. (No model.)

*To all whom it may concern:*

Be it known that we, JAMES MUNDELL and WILLIAM J. GORDON, citizens of the United States, residing at the city and county of Philadelphia, in the State of Pennsylvania, have invented new and useful Improvements in Machines for Cutting Shoe-Soles, of which the following is a specification.

The object of our invention is to produce a machine for automatically feeding and cutting soles from what are known as "sole-blanks," now made and furnished manufacturers of boots and shoes as an article of trade. Such sole-blanks are previously cut out of a strip of leather to avoid unnecessary waste, and our machine is for producing soles therefrom after the blanks have been shaved, compressed, and assorted as to their size. The machine for this purpose embraces a construction and operation in which the sole-blanks are fed intermittently in succession from a stack confined in a hopper, delivered to the cutting-die, cut into a sole by the action of a pressing-block, and discharged from the cutting-die, all by an organized machine, in which the functions of the operating parts are rendered automatic by connection with the press-operating shaft. A horizontal slide having a stepped surface forms the bottom of the hopper and supports the stack of blanks in position to be fed therefrom, one at a time, from the bottom of the stack at the bottom of the hopper to the cutting-die. In this feed the blank is carried by the stepped or lower surface-level of the slide to a position between the hopper and the cutting-die by the full rearward movement of the slide and deposited upon a bed-plate. The return movement of the slide to carry its stepped surface back into the hopper to receive another blank is effected in the movement by which it frees itself of the blank which it had carried out. In this operation the blank is held in the position thus fed by means of spring-detents falling in front of the front edge of the blank, while the slide withdraws from beneath it, leaving it to fall upon the bed-plate in position to be struck and pushed forward upon the spring-sustained table of the cutting-die by the succeeding forward movement of the slide. In this operation the inner or rear end of the slide strikes the front edge of the sole lying on the bed-plate and pushes it in a registered position over the cutting-die and beneath the pressing-block. At the same time another blank is fed from the hopper upon the stepped or lower level surface of the slide in position to be deposited in like manner upon the bed-plate. The operation, therefore, of taking the blank from the hopper and placing it upon the cutting-die is effected by two stages or movements, in one of which it is carried and in the other it is pushed by the slide which sustains the stack of blanks. This is a distinguishing part of our invention, which embraces other matters of construction and of combinations, which we will now proceed to describe in connection with the accompanying drawings, which illustrate our invention of producing shoe-soles from blanks fed singly from a stack confined in a hopper.

In these drawings, Figure 1 represents a side elevation of the machine, showing the connection of the press-operating shaft, with the mechanism for feeding the sole-blanks from the hopper to the cutting-die; Fig. 2, a front view of the same; Fig. 3, a vertical section showing the stack of sole-blanks in the hopper, the bottom one of which is in the stepped or lowest surface-level of the slide, ready to be carried out at the bottom of the hopper, a previously-fed blank being shown in position on the bed-plate to be shoved over and upon the cutting-die by the same movement of the slide; Fig. 4, a similar section, showing the slide in the position it occupies when the sole-blank has been carried by it from the hopper in position to be deposited upon the bed-plate, the previously deposited sole-blank being shown as having been pushed from the bed-plate over the cutting-die in position to be cut into a sole; Fig. 5, a vertical section showing one end of the hopper, means for securing and adjusting its ends for different lengths of blanks, and the manner in which the guide-arms for directing the sole-blanks from the hopper to the cutting-die, are pivoted to the outer sides of the hopper ends; Fig. 6, a side elevation of the mechanism for feeding the sole-blanks from the hopper and cutting out the sole; Fig. 7, a front elevation of the same; Fig. 8, a top or plan view of the same, the sole-blanks being shown by dotted lines in the hopper; Fig. 9, a top view of the pressing-block and its holding-frame; Fig. 10, an under side view of the spring-sustained table of the cutting-die; Fig. 11, a cross-section of the cutting-die and its spring-sustained table; Fig. 12, a longitudinal section of the same; Fig. 13, a top view of the same enlarged; Fig. 14, an end view of the same; Fig. 15, detail views of one of the pivoted arms for guiding the blank from the hopper, showing the lipped plate which overlies the ends of the blank fed out upon the stepped surface of the feeding-slide; Fig. 16, a top view of the stepped slide; and Fig. 17, the sole-blank, the dotted lines showing the sole as it is cut therefrom, according to the register-feed of the stepped slide. Fig. 18, Sheet 2, is a detail of the clutch device for starting and stopping the machine.

The frame of the machine is preferably such as that used in machines for cutting and stamping sheet metal in which the stamping or cutting die is carried by a vertically-reciprocating slide mounted in guides in a top frame and operated by a horizontal shaft having an eccentric connected with said slide. In such frame, A is the main supporting part, upon which the top press-carrying part B, is mounted. C is the operating-shaft; D, the vertically-reciprocating slide, which carries the stamp-block secured in guides E at the front of the top frame; F, the box, pivoted to the upper end of the slide and connecting it with the eccentric of the shaft, which is operated by a band-pulley, H, loose thereon, and provided with a clutch device connecting with a treadle, I, whereby the machine is placed under the control of the attendant and operated with a regular and uniform speed.

The feeding-slide, the cutting-die, and the hopper for the blanks are carried by a bed-plate, $a$, secured to the press-carrying part B, so that the cutting-die will be in position beneath the pressing-block $b$ and the hopper in front thereof, the slide being operated by the press-operating shaft to feed the blanks from a stack confined in the hopper. Such a feed we have applied to and used with a stamping-press with comparatively little cost as an organized machine, requiring no special skill to attend it, and producing in a given time a much greater number of sole-blanks than could be produced by hand-feed, thus lessening the cost of production. The bed-plate $a$ projects considerably in front of the machine, and its top surface is of two levels, the lower one, $c$, being beneath the pressing-block $b$, and carrying the cutting-die, as shown in Figs. 3 and 4, on a level with the highest plane of the bed-plate.

The hopper we prefer to make of two vertical end plates, $e$ $e$, leaving the front and rear sides, $e'$ $e'$, projecting only sufficient to receive and confine the ends of the blanks, as in Fig. 8, and allow them to descend freely therein as the bottom one is fed out by the slide. The vertical hopper-forming plates are formed with foot-projections $e^2$ $e^2$, by which they are secured by screws $e^3$ $e^3$ to the base-plate. The hopper ends are adjusted nearer to or farther from each other to suit the length of the blanks, there being for this purpose slots $e^4$ in their foot-projections, through which the confining-screws pass into the base-plate, as shown in Figs. 5 and 8.

The slide $f$ forms the bottom of the hopper and feeds the blanks therefrom. It slides upon the highest level of the bed-plate $a$, and partly over and upon the spring-sustained table of the cutting-die, and has its upper surface stepped or formed of two levels. The lower one, $f$, forms the feeder by means of a shoulder, $f^2$, which divides the two levels. This surface-shoulder is preferably curved to correspond with the curve of the edge of the sole-blank, as shown in Fig. 8, and the lower surface-level, $f'$, Figs. 3, 4, 8, and 16, is sufficiently depressed to receive the thickness of the blank when this stepped part of the slide is within the hopper, and by means of the surface cross-shoulder $f^2 f^2$ to carry the blank out of the hopper as the slide is moved toward and over the spring-sustained table. In this feed of the blank it is let down so that its top surface will pass freely under the lower ends of the rear sides $e'$ $e'$ of the hopper, while the next blank above of the superimposed stack will be held within the hopper by said sides, so that one blank only can pass out of the hopper at each rearward movement of the slide. It is maintained in proper relation to the hopper by a front slide part, $f^3$, of less width, fitted in a recess in the upper surface of the bed-plate, with beveled edges, as shown in Figs. 4 and 7, whereby the slide resting upon the surface of the bed-plate is operated in a direct line with a reciprocating feed movement, produced by the following mechanism: The slide part $f^3$ is pivoted to a horizontal rod, G, which connects with an arm, J, upon a horizontal rock-shaft, K, mounted in bearings across the front of the bed-plate. An arm, L, upon one end of this shaft connects with a rod, M, the upper end of which is connected with a crank-pin, N, on the end of the press-operating shaft, whereby the slide $f$ is operated to feed the blanks from the hopper to the cutting-die. This feed of the sole-blanks is effected simultaneously with the ascent of the stamp-block from the shaft which operates it so as to carry a blank from the bottom of the stack and deliver it in exact position over the cutting-edge of the die to cut off the waste and produce the sole. The exact movement of the slide for this purpose is effected by adjusting the connecting-rod M in a slot, P, in the arm L, nearer to or farther from the cross-shaft K, as shown in Figs. 1 and 6, and thereby cause the slide to move the distance required to place the blank in a registered position over the cutting-edge of the die. To render certain this exact feed of the blank, the slide is provided with a fixed arm, Q, having its front end bent downward to receive a set-screw, R, with its point in position to strike the front of the bed-plate, and thus serve as a stop to limit the rearward movement of the slide. When set, a lock-nut, R', secures the screw. This capacity for adjusting the feed of the slide, in connection with the adjustable hopper ends, adapts the machine for feeding sole-blanks of different sizes to the same or different sizes of cutting dies.

A spring, S, connected with the frame A and with an arm, T, on the rock-shaft, constantly exerts a force to carry the slide forward to its full limit, and thereby overcome any binding or lost motion in the rearward movement of the slide, so that the feed of the blank will be at all times such as to properly position the blank upon the cutting-die to receive the descent of the pressing-block. As the blank is carried out of the hopper it is moved between two horizontal arms, U U, by which it is guided and kept in position lengthwise upon the slide and upon the bed-plate, so that its heel and toe parts will exactly match with the heel and toe parts of the cutting-die when moved upon it. These arms are pivoted to the outer sides of the hopper ends $e$ and lie upon the top of the bed-plate $a$, and extend over and upon the spring-sustained table of the die, so that their inner edges will pass in line with the heel and toe parts of the cutting-die and in close proximity to the edges of the feeding-slide $f$, as shown in Fig. 8. Their pivot-bearings are formed by hangers V, pinned upon studs V', projecting from the hopper ends, and upon these studs the arms can be turned up from the spring-sustained table to allow the cutting device to be removed from the bed-plate. They are maintained in proper positions upon the table by means of springs $V^2$, one for each arm, attached to the ends of the hopper and to a bracket, $V^3$, on each arm. While these guide-arms are thus adapted to be turned up for the purpose stated, they are also adapted to turn out while maintaining their contact with the table to prevent the sole-blank from binding as it is fed along between them, and to allow for any unequal lengths of blanks. Therefore these arms are pivoted to their pivoted carrying-hangers by screws $g$, tapped into their under sides, as shown in Fig. 5. They are held in line with and against the hopper ends by the springs $V^2$, which, it will be seen, are arranged to pull the arms downward and inward, being connected to them in rear of their hangers. While both arms are pivoted so as to open, as stated, it is only necessary that one should yield to the passage of the blank, and the other may be clamped to its hanger; or one spring may be stronger than the other, so that one arm will move out easily. The arms form side guides upon the die-table to keep the blank in place as it is pushed by the slide and positioned upon the cutting-die by the pushing action of the slide. The sole-blank carried out from the hopper by the feeding-slide is delivered therefrom during its return movement by means of detents X, formed like the beveled end of the latch of a door-lock, one arranged upon the rear side $e'$ of each hopper end, carried by a vertical stem, $x$, within projections $x'$, between which a spring, $x^2$, is placed, constantly pressing down the detents. They bear upon the slide $f$, with their beveled faces next the hopper and just behind the opening through which the blanks are fed from the hopper.

Referring to Fig. 4, the slide is shown as having carried a sole-blank out of the hopper and the detents resting upon the highest level of the slide $f$, just in front of its surface-dividing shoulder $f^2$, the depth of which is a little less than the thickness of the sole-blank. The return movement of the slide to bring its lowest surface-level within the hopper to receive another blank brings the edge of the fed blank at the slide-shoulder $f^2$ in contact with the flat faces of the detents, which thus operate to strip the blank from the slide by dropping from the highest to the lowest level of the slide. As the blank is carried out from the hopper its rear edge strikes against the beveled faces of the detents and raises them so that it is fed out, with the detents resting upon it; and it will be understood that the extent of the rearward movement of the slide must be such as to carry its surface-shoulder $f^2$ behind the detents, while the blank will be delivered by the detents so as to clear the action of the pressing-block, as shown in Fig. 3. If, however, by reason of the unequal width of some of the blanks, the pressing-block should, in its descent, strike the edge of the blank resting upon the bed-plate, it would thereby be turned up and liable to be displaced from a position to receive the pushing action of the slide in its next rearward movement. Therefore to prevent such a contingency, the guide-arms are provided with inward-projecting lips W, which overhang the side edges of the slide at opposite points contiguous to the dividing-shoulder of the slide, and therefore over the front edge of the blank, and thus prevent its being turned up or displaced in the event of the pressing-block striking its rear edge, so that the blank will always keep its position upon the bed-plate to receive the pushing action of the slide, as shown in Fig. 3.

The pressing-block $b$ is of suitable hard wood or of suitable metal, secured tightly within an oblong open frame, Y, which is mounted above the cutting-die, upon four guide-posts, $y$, and sustained upon springs $y'$, coiled around said posts in position to receive the action of the press to cut out the sole from the blank supported upon the spring-sustained table. The pressing-block is secured by bolts $z$ passing crosswise through the frame and through slots $x'$, Fig. 7, in the frame, so as to allow the block to have an endwise adjustment upon said bolts within its frame, to bring an uncut part over the edges of cutting-die, and thus allow the block to be used much longer. This endwise adjustment is effected by screws $z^2$ passing through the ends of the frame, bearing against followers at each end of the block, each screw having a lock-nut, $z^3$, to secure it when set, as shown in Fig. 9. By unscrewing one and screwing up the other screw the block can be moved in its frame, and when one of its surfaces is full of cuts it can be reversed in its frame to use the other surface. The guide-posts $y$ for the block-frame are screwed into taps in the bed-plate $a$, and the pressing-block is adjusted thereon by tap-nuts $y^2$, so as to maintain the pressing-block in proper relation between the cutting-edge of the die and the follower $D'$ of the press-slide.

The cutting device consists of a cutting-die, $h$, a spring-sustained table for the sole-blank, and a carrying-plate for both. The cutting-die is of steel, of the form of the sole, and is secured to the carrying-plate $i$ by screw-bolts $h'$ passing through projections riveted to the ends of the die, as shown in Fig. 12. The carrying-plate $i$ is fitted within a recess in the upper surface of the lower level, $c$, of the bed-plate $a$, being held therein by beveled edges. It is slid in its recessed seat from the side of the machine, so that the cutting-die will be behind the feeding-slide. It is adjusted endwise within its seat in proper relation to the feeding-slide by means of plates $i'$ $i'$ fitted into said recess against the opposite ends of the carrying-plate $i$, and secured by screws $i^2$ $i^2$ passing through slots in said end plates into taps in the bed-plate. (Shown in Fig. 8.) The spring-sustained table is in five surface-sections, $j\ k\ l\ m\ m'$, Fig. 13, all on a plane at the top, all movable together vertically under the action of the press in the same plane below the cutting-edge of the die, and four, $k\ l\ m\ m'$, movable horizontally toward and from the cutting-edge of the die, leaving one section or part, $j$, having a fixed relation horizontally to the cutting-die. This surface-section $j$ is supported upon four springs, $j'$, two at each end, and forms one side and the ends of the table, as shown in Fig. 13, and carries the four movable surface-sections so that one cannot yield vertically independently of the other. This surface-section $j$ is secured to the plate $k$, placed beneath the top of the plate $k$, and the two plates $j\ k^2$ carry the four said movable sections. The horizontally-yielding sections are arranged to constantly hug the outer sides of the die, and thus effect a close and certain stripping of the leather from the cutting-edge. Of these stripping surface-sections two, $k\ l$, join the sides of the cutting-die, and two, $m\ m'$, its ends, the latter being secured to the under sides of the main surface-section $j$ by screws $n$ passing through slots in said end sections into the main section, as shown in Figs. 10 and 13, and are constantly forced inward against the outer side of the cutting-die. These end sections, $m\ m'$, are arranged to slide in recesses in the inner edges of the ends of the main section $j$ and between the ends of the side sections. Of these side sections one, $l$, is arranged between the cutting-die and the main section, the other side section $k$, forming the other side of the table. The surface-section $l$ is secured to the under side of the main section $j$ by screws $l'$ passing through slots in said section $l$, the bottom of which extends beneath the main section, as shown in Fig. 11. The surface-section $k$ is secured by screws $k'$ to the upper surface of a plate, $k^2$, secured to the under side of the main section $j$, the said under plate, $k^2$, having slots, through which the screws $k'$ pass. By this construction the top plate, $j$, on one side of the cutting-die and the under plate, $k^2$, on the other side of the die are secured together by the screws $p$, Fig. 13, so that they have a fixed relation to each other and to the cutting-die horizontally. Upon these plates the surface-sections $k\ l\ m\ m'$ are secured, so that they will open as they are forced down by the pressing-block over the curved sides of the cutting-die. These side yielding plates, $k\ l$, are connected to each other at their ends by springs $q\ q$, secured to pins $r'\ r'$ in the under side of the surface-section $j$, so as to constantly pull the plates $k\ l$ against the outer walls of the cutting-die. In this movement of the plates $k\ l$ the plate $k$ is confined to the fixed under plate, $k^2$, by screws $k'$, which move in slots in the under fixed plate, $k^2$, as shown in Fig. 10. These springs also bear against pins $s\ s$ in the under sides of the end surface-sections, $m\ m'$, and thus serve to press them inward against the heel and toe parts of the cutting-die, thus forming a spring-sustained table of sections conforming to the outline of the cutting-die, having a constant contact therewith and forming the support for the sole-blank as it is fed upon the cutting-die.

The spring-sustained table is attached to the carrying-plate by headed pins $t$, riveted into the under sides of the plates $j$ and $k^2$ and passing through openings in the carrying-plate, the heads of the pins being countersunk on the under side of said plate, as in Fig. 14, and forming stops to limit the ascent of the table, so that its upper surface will be slightly above the cutting-edge when the table is not under pressure.

An ejecting-plate, $u$, is placed within the cutting-die to sustain and eject the cut-out sole, and is attached to the carrying-plate and sustained in the same manner as the table and on a level therewith, whereby the sole and the waste cut from the edges of the blank are ejected from the cutting-die and both supported in position to be discharged from the table by the feed of the next succeeding blank.

In cutting soles from sole-blanks the close-stripping action of the table-sections renders the freeing of the leather from the cutting-die easy and certain, so that it is impossible for cut parts to hang in the stripping-joints of the table. The cut sole may, however, be discharged through the die, in which case the center ejecting-plate would not be used and the carrying-plate and the bed-plate would have openings corresponding in form to the die.

The machine is organized, as shown and described, for cutting soles, either for a right or for a left shoe, from blanks fed, one at a time, from a hopper, and it is obvious that under the same steps of the operation and with slight changes in the slide and hopper two blanks may be fed at a time, one upon the other, and both positioned upon the die so as to produce at one cut a right and left sole.

The sole blanks having been stacked in the hopper to the desired height, and the adjustments made to feed the blanks according to their size, the machine is put in operation and the blanks fed from the bottom of the stack by the slide, as stated. A blank having been delivered from the slide upon the bed-plate, the next movement of the slide to feed out another blank at the same time and by the same movement pushes the blank resting upon the bed-plate in proper position upon the cutting-die. The pressing-block then descends, by the action of the driver D, upon the blank or blanks and cuts out a sole or soles, the spring-sustained table yielding under the operation until the acting surface of the pressing-block strikes the cutting-edge of the die, completing the cut. The ascent of the pressing-block leaves the sole and waste upon the table to be carried back and discharged over the incline X' at the rear of the bed-plate by the feed of the next blank pushing them off. The movements of the pressing-block and of the feeding-slide are so timed that the former will have reached its full ascent before the latter has completed its full rearward movement with the blank, and the descent of the pressing-block will have reached its limit and commence rising, and is free of the cut sole before the slide commences its rearward movement to feed the next blank upon the cutting-die. In this operation the slide performs the several functions of a bottom for the hopper containing the sole-blanks, a receptacle for the blank to be fed from the hopper, a feeder of the blank from the hopper, a depositor for the blank upon the bed-plate, a feeder of the blank from the bed-plate to the cutting-die, positions it upon said die, and finally discharges the cut sole and waste from the spring-sustained table to clear the way for the next succeeding blank to be cut.

When the machine is constructed with the slide and the hopper adapted to feed one blank at a time, as shown, a right or a left sole can be produced at the same cutting.

It is obvious that with proper changes more than two blanks may be fed at a time; but whatever the number the height of the shoulder of the feeding-slide and the height of the opening at the lower ends of the rear sides of the hopper and the height of the pressing-block above the cutting-die must be made to accord with such number of blanks.

Whether the sole produced be right or left is determined by placing the blanks in the hopper with their outer sides up or down.

The carrying-plate of the cutting-die is made removable from the bed-plate, so that a larger or a smaller die can be adjusted in place, as may be required.

The clutch device for starting and stopping the machine may be of any suitable construction. That shown in Fig. 18 consists of a collar adapted to slide but not to turn upon the shaft C, provided with pins 2 2, projecting horizontally from its face into slots in a collar, 3, fixed upon said shaft. A spring-pin, 4, fitted in the standard B bears against the sliding collar and constantly tends to press its pins 2 into holes in the hub of the loose band-pulley. A wedge-arm, 5, pivoted to the standard B is connected by a rod, 6, with the treadle I, which is constantly pulled up against a stop, I', by a spring, 7, connected with the base-frame.

When the machine is not working the wedge end 5 of the pivoted arm is forced by the treadle-rod between the fixed and the sliding collars 1 and 3, pressing the latter away from the fixed collar, as in Fig. 2, the pins 2 2 being thus withdrawn from the holes in the hub of the loose pulley H, so that the latter will revolve upon the shaft.

To start the machine, the attendant depresses the treadle, which withdraws the wedge-arm 5 from between the collars 1 and 3, when the pins of the sliding collar will be forced into the holes in the loose pulley, so as to lock it with the fixed collar to operate the press.

We claim—

1. The combination, substantially herein described, of a suitable sole-cutting die and a vertically-operating stamp or press with a horizontal reciprocating stepped feeding-slide, a hopper for containing sole-blanks in stack, detent-spring devices supported upon said slide, a non-moving surface or table to receive the blank from the slide between the hopper and the die, and mechanism for operating the stamp or press and the slide, substantially as described, for the purpose specified.

2. The combination, substantially herein described, in a machine for cutting soles, of a fixed cutting-die, a spring-sustained table, and a vertically-operating pressing block or surface, with a horizontal reciprocating stepped feeding-slide, a hopper for containing sole-blanks in stack upon said slide, and a device for depositing the fed blank or blanks from said slide upon a non-moving surface in such relation to the cutting-die as to be fed thereon intermittently by said slide in the operation of cutting soles from sole-blanks.

3. The combination, substantially herein described, in a sole-cutting machine, of a suitable sole-cutting die and a vertically-operating pressing block or surface, with a horizontal reciprocating stepped feeding-slide, a hopper for containing sole-blanks in stack upon said slide, a yielding device for depositing the fed blank or blanks from said slide upon a non-moving surface, and mechanism for connecting and operating said feeding-slide from the operating-shaft, substantially as described, for the purpose specified.

4. The combination, substantially herein described, in a sole-cutting machine, of a suitable sole-cutting die and a vertically-operating pressing block or surface, with a horizontal reciprocating stepped feeding-slide, a hopper for containing sole-blanks in stack upon said slide, a device for depositing the fed blank or blanks from said slide upon a non-moving surface, the rock-shaft K, having the slide-connecting arm G, the slotted arm L, the rod M, and the press-operating shaft, connected by an eccentric pin with said slotted arm, whereby the feeding-slide is operated and controlled by the operations of the press to position the blank over and upon the cutting-die.

5. The combination, substantially herein described, in a sole-cutting machine, of a suitable sole-cutting die and a vertically-operating pressing block or surface, with a horizontal reciprocating stepped feeding-slide, a hopper for containing sole-blanks in stack upon said slide, a detent-spring device for depositing the fed blank or blanks from said slide upon a non-moving surface, with mechanism, substantially described, for connecting and operating said feeding-slide from the operating-shaft, means, substantially as described, for insuring the full rearward movement of the slide and for limiting such movement to position the blank over and upon the cutting-die.

6. In combination, in a sole-cutting machine, a cutting-die, a pressing-block, a horizontal reciprocating feeding-slide having a stepped surface, a hopper for containing sole-blanks in stack, the vertically-operating spring-detents X, the rock-shaft K, having the slide and press connecting arms J L and the arm T, the stop device Q R, and the spring S, connecting said arm T with the frame, all constructed and arranged for operating and controlling the operations of the slide, the delivering of the blank or blanks therefrom and its feed to a register position with the cutting-die, substantially as described, for the purpose specified.

7. In combination, in a sole-cutting machine, a cutting-die, a pressing-block, a reciprocating feeding-slide having a stepped surface, a hopper for containing sole-blanks in stack, a device for depositing the fed blank or blanks from said slide upon a non-moving surface, and the pivoted spring guide-arms U U, all arranged for operation in feeding and delivering the sole blank or blanks from the stack in position upon the cutting-die to be cut into a sole or soles.

8. In combination, in a sole-cutting machine, a fixed cutting-die, a spring-sustained table, a spring-sustained pressing-block, a reciprocating feeding-slide having a stepped surface, a hopper containing sole-blanks in stack upon said hopper, a device for depositing the fed blank or blanks from said slide upon a non-moving surface, and mechanism, substantially described, whereby the slide and the pressing-block are connected with and operated by the operating-shaft to feed and deliver the sole blank or blanks from the stack in position upon the cutter and cut into a sole or soles.

9. In a machine for producing shoe-soles from sole-blanks, the combination, substantially herein described, of a hopper for containing sole-blanks in stack, and a slide having a surface of different levels, $f\ f'$, with the detent-spring devices arranged to rest upon said slide to deliver the blank or blanks therefrom, and a cutting-die arranged to receive the deposited blank or blanks by the pushing action of the slide.

10. The combination of a fixed cutting-die and a spring-sustained table with a spring-sustained pressing block or surface and means, substantially herein described, for supporting it between said die and the driver or stamp block independent of it and in proper relation to said die.

11. The combination, with the fixed cutting-die, of a sectional spring-sustained table, and means, substantially described, for maintaining the sections in contact with the outer walls of the cutting-die, substantially as described, for the purpose specified.

12. The combination, with the fixed cutting-die, of a spring-sustained table consisting of the rigidly-connected plates $j k^2$, the side plates, $l\ k$, and heel and toe sections $m\ m'$, supported by said rigidly-connected plates, and the springs $q\ q$, attached to each end of the side sections, $l\ k$, at the under side of the table across the heel and toe sections against projections thereon, whereby the surface-sections joining the cutting-die are maintained in contact therewith, and adapted for both vertical and horizontal movement in relation to the fixed die, substantially as described, for the purpose specified.

13. The combination, with the fixed cutting-die, of a sectional spring-sustained table, means, substantially described, for maintaining the sections in contact with the outer walls of the cutting-die, and a separate interior spring-sustained ejector, substantially as described, for the purpose specified.

14. The combination, substantially as herein described, in a machine for cutting soles, of a hopper for containing sole-blanks in stack, a reciprocating feeding-slide supporting said blanks in stack, and a device for depositing the fed blank or blanks from said slide upon a non-moving surface, with a cutting-die having a spring-sustained table, means, substantially described, whereby the said die is adjusted laterally in relation to said feeding-die, and a vertically-operating pressing-block, for the purpose specified.

15. In a machine for cutting shoe-soles from sole-blanks, the combination of a cutting-die, a spring-sustained table therefor, a pressing-block, a reciprocating feeding-slide having a stepped surface, a hopper for containing sole-blanks in stack, a device for depositing the fed blank or blanks from said slide upon a non-moving surface, with pivoted guide U U, provided with the edge-lips W, overhanging said slide, and the spring V², all constructed and arranged substantially as described, for the purpose specified.

In testimony whereof we have hereunto set our hands in the presence of two subscribing witnesses.

JAMES MUNDELL.
WILLIAM J. GORDON.

Witnesses:
W. F. WILKINS,
SAML. B. S. BARTH.